United States Patent [19]

Kumabe et al.

[11] 3,753,136

[45] Aug. 14, 1973

[54] SOLID STATE TRAVELING WAVE AMPLIFYING DEVICE

[75] Inventors: Kenji Kumabe, Kodaira; Hiroshi Kanbe, Tanashi; Riro Nii, Tokyo, all of Japan

[73] Assignee: Nippon Telegraph and Telephone Public Corporation, Tokyo, Japan

[22] Filed: Feb. 12, 1971

[21] Appl. No.: 114,970

[30] Foreign Application Priority Data

Feb. 24, 1970 Japan .............................. 45/15336
Sept. 28, 1970 Japan .............................. 45/84546

[52] U.S. Cl. .................... 330/5, 330/38 R;39;61 A
[51] Int. Cl. .................................... H03f 3/04
[58] Field of Search ................................ 330/5

[56] References Cited

UNITED STATES PATENTS 3,621,306 11/1971 Schickle ................................ 330/5

FOREIGN PATENTS OR APPLICATIONS 6,812,862 3/1970 Netherlands ........................... 330/5

*Primary Examiner*—Roy Lake
*Assistant Examiner*—Darwin R. Hostetter
*Attorney*—Wolfe, Hubbard, Leydig, Voit & Osann

[57] ABSTRACT

This invention relates to a solid state travelling wave amplifying device, utilizing such a semiconductor as *n*-type GaAs or *n*-type InP in which average velocity of electrons decreases with increasing electric field strength when an electric field of which field strength being higher than a critical value is applied, said semiconductor is provided with additional ohmic electrode or electrodes at input side and/or output side in addition to main electrodes comprising positive and negative electrodes so that an external DC energy will be supplied through the additional electrode.

9 Claims, 11 Drawing Figures

INVENTORS
KENJI KUMABE
HIROSHI KANBE
RIRO NII

BY
Wolfe, Hubbard, Leydig, Voit & Osann
ATTORNEYS

INVENTORS
KENJI KUMABE
HIROSHI KANBE
RIRO NII

BY
Wolfe, Hubbard, Leydig, Voit & Osann
ATTORNEYS

INVENTORS
KENJI KUMABE
HIROSHI KANBE
RIRO NII
BY
Wolfe, Hubbard, Leydig, Voit & Osann
ATTORNEYS

INVENTORS
KENJI KUMABE
HIROSHI KANBE
RIRO NII

BY
Wolfe, Hubbard, Leydig, Voit & Osann
ATTORNEYS

SOLID STATE TRAVELING WAVE AMPLIFYING DEVICE

This invention relates to an improvement in solid state amplifying devices for microwave signals utilizing growing space-charge waves in a semiconductor having negative differential mobility.

There have been suggested various types of solid state travelling wave amplifying devices, and these devices may be classified briefly into ones in which the semiconductor itself has no active factor and the amplifying effect is obtained by mutual action between different type waves which travel substantially at the same velocity with electrons or holes inside the semiconductor and internal current of the semiconductor, and unilateral amplifiers utilizing growing space-charge waves in the semiconductor having a negative differential mobility as, for example, the one disclosed in Koyama et al. U.S. Pat. No. 3,464,020. The present invention is characterized in that, in the solid state travelling wave amplifying device utilizing a semiconductor having the negative differential mobility, at least one additional ohmic electrode is provided at the input side or output side or at both the input and output sides of the semiconductor in addition to main ohmic electrodes of anode and cathode, so that a DC energy can be supplied to said semiconductor through these additional electrodes. Hereinafter, the terms "anode" and "cathode" will be used for indicating the electrodes through which positive and negative polarities of the biasing voltage are applied to the semiconductor.

The present invention will be explained in detail with reference to accompanying drawings, in which.

Generally, when a semiconductor element such as *n*-type GaAs, *n*-type InP or *n*-type CdTe is provided with two ohmic electrodes which are to be negative and positive electrodes and a DC electric field is applied to the semiconductor by means of these two electrodes, the average velocity of drifting electrons inside the semiconductor will, within a range where the field strength does not exceed a below-mentioned critical value, be increased in accordance with the increase of the DC field strength. However, when the electric field strength becomes higher than a certain value (which will be referred to as a "critical value" hereinafter), then the electrons' average velocity will be decreased depending upon the increase of electric field strength. Such a phenomenon is called "Gunn effect." According to another expression, the movement of electrons shows a negative differential mobility in an electric field which strength is above the critical value. For example, the critical electric field strength value in *n*-type GaAs semiconductor is 3.2 KV/cm.

As stated above, if an electric field producing a field strength higher than the critical value is applied to a semiconductor crystal such as *n*-type GaAs, a negative differential mobility is caused to appear in the crystal, thereby space-charge waves in the crystal are made to grow in the drifting direction of electrons. There have been already suggested unilateral solid state travelling wave amplifying devices which operate in the microwave frequency band utilizing the above growing travelling waves (space-charge waves).

Figure 1:
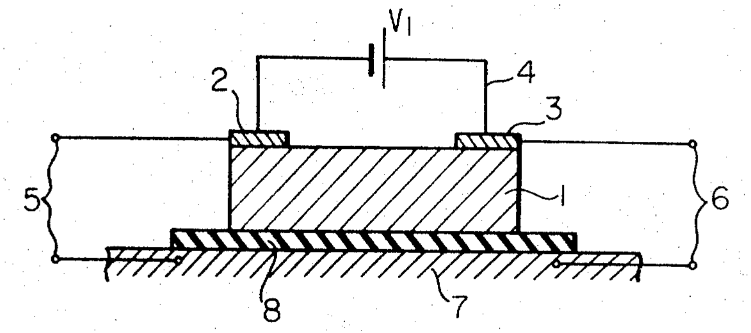
FIG. 1 shows an exemplary one of the conventional solid state travelling wave amplifying device.

An example of conventional solid state travelling wave amplifying devices utilizing the above described principle is shown in FIG. 1. In the drawing, an amplifier element 1 is a semiconductor having a negative differential mobility such as, for example, a crystal of *n*-type GaAs. At respective edge portions of this amplifier element 1, a negative electrode 2 and a positive electrode 3 are provided, and a DC voltage $V_1$ is applied between the cathode 2 and anode 3 by means of a DC biasing circuit 4 in a polarity as shown in the drawing. 5 is a pair of input terminal for microwaves, 6 is a pair of output terminal for microwaves, 7 is a metal plate and 8 is a dielectric insulator such as, for example, a Beryllium oxide film. In the above amplifier element 1, when a microwave signal is applied to the input terminal 5, under the state that the strength of the DC electric field applied through the cathode and anode 2 and 3 exceeds the aforesaid critical value, space-charge waves are excited in the amplifying element 1, which waves are made to grow in the drifting direction of the electrons, thereby it is made possible to take out an amplified microwave output power from the output terminals 6.

In such a conventional solid state travelling wave amplifying device, however, there have been provided no means for improving coupling efficiency of the microwave to the space-charge wave and, therefore, these devices have not been sufficiently satisfactory from such points of view as high gain, high output power and low noise. According to the present invention, the solid state travelling wave amplifying device utilizing a semiconductor having negative differential mobility is provided with an additional ohmic electrode or electrodes at the output side or input side of said semiconductor, or at both of these output and input sides, in addition to the main ohmic electrode comprising a negative electrode and a positive electrode as provided on the semiconductor, and an external DC circuit is connected with the additional electrode so that the characteristics of high gain, high output power and low noise will be obtained.

Thus, an object of the present invention is to provide a solid state travelling wave amplifying device of high gain and yet of low noise.

Another object of the present invention is to provide a solid state travelling wave amplifying device of a high saturation output power.

The present invention will be explained with reference to certain embodiments next.

Figure 2:
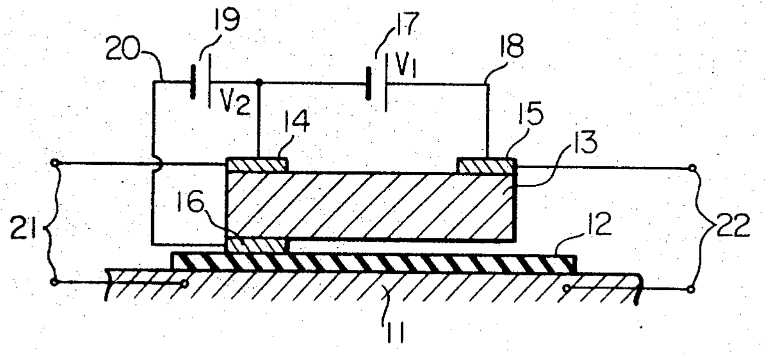
FIG. 2 shows an embodiment of the solid state amplifying device for travelling waves according to the present invention.

In FIG. 2, 11 is a conductive base board such as a metal plate, above which is provided through a dielectric insulator 12 an amplifier element 13 which consists of a semiconductor having a negative differential mobility such as, for example, *n*-type GaAs crystal or the like, and at respective edge portions of said amplifier element 13 a negative electrode 14 and a positive electrode 15 are provided, respectively. At an edge portion of the other surface of the element 13 opposed to the negative electrode 14, there is provided further a third ohmic electrode 16. This electrode 16 is grounded in the meaning of high frequency with conventionally well known art. It should be noted that the main electrode and additional electrodes to be referred to hereinafter should be all considered to be ohmic electrodes. Now, between the above mentioned negative electrode 14 and positive electrode 15 a DC power supply 17 of a voltage $V_1$ is connected through a DC biasing circuit 18, namely its positive electrode is connected with the anode 15 and its negative electrode is connected with the cathode 14. Further, between the said cathode 14 and the third electrode 16 a DC power supply 19 of a voltage $V_2$ is connected through a further DC biasing circuit 20, namely its positive electrode is connected with said cathode 14 and its negative electrode is with the third electrode 16. In this case, it is established by a known means that the microwave power will not be supplied to the DC biasing circuits 18 and 20. The cathode 14 and the conductive base board 11 are respectively connected to a pair of microwave input terminals 21 and the anode 15 and the conductive base board 11 are respectively connected to a pair of microwave output terminals 22.

Now, when a DC voltage $V_2$ is applied between the cathode 14 and the third electrode 16 by means of the DC biasing circuit 20, electric field distribution in the crystal is varied at the portion between the cathode 14 and the third electrode 16 of the amplifier element 13, whereby the region in which electrons having negative differential mobility exist will be expanded. Suppose a microwave signal is applied to the input terminal 21 under the above-mentioned state and, then, in the amplifier element 13 the space-charge wave is excited with high efficiency. When the said DC voltage $V_2$ is increased to be above a critical value at which the field strength in the electrode 14-to-16 direction reaches the critical value, the region of the element 13 between the cathode 14 and the third electrode 16 shows a negative resistance as a whole, and the input microwave signal excites the space-charge wave efficiently. Here, if a microwave is applied to the element through the input terminals 21 under a condition where a DC voltage $V_2$ above a certain critical value is applied between the cathode 14 and the third electrode 16 by means of the DC biasing circuit 20 and the DC voltage $V_1$ is applied between the cathode 14 and the anode 15 by means of the DC biasing circuit 18 so that the electric field strength in the input region of the amplifier element 13 will exceed the critical value, the space-charge wave will be efficiently excited in the input region of the amplifier element 13, which space-charge wave will grow in the drifting direction of electrons and, thus, it is made possible to take out an amplified microwave output power through the output terminals 22 with high gain. Incidentally, the polarity of said DC power supply 19 may be in the reverse relationship to that shown in the drawing.

Figure 3:
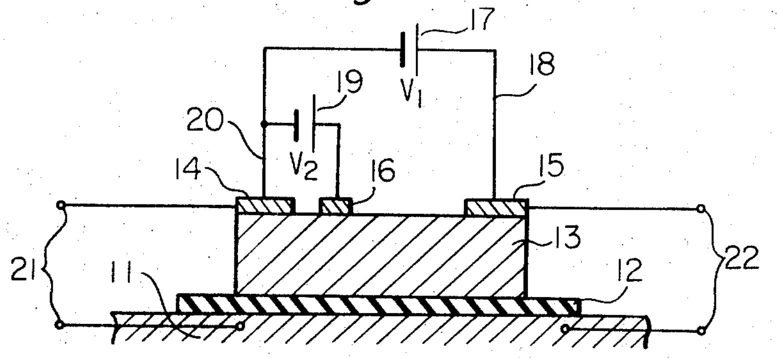
FIGS. 3 to 6 show another embodiments of the present invention, respectively.

FIG. 3 shows another embodiment, in which the third electrode 16 is provided on substantially the same plane with the electrode 14. In this case, also, the excitation of the space-charge wave is carried out between the cathode 14 and the third electrode 16. In this drawing, the parts identical to those shown in FIG. 2 are identified with the same reference numerals and their explanations are omitted here. It should be noted that the same high frequency earthing of the third electrode 16 as in the case of FIG. 2 is performed.

Figure 4:
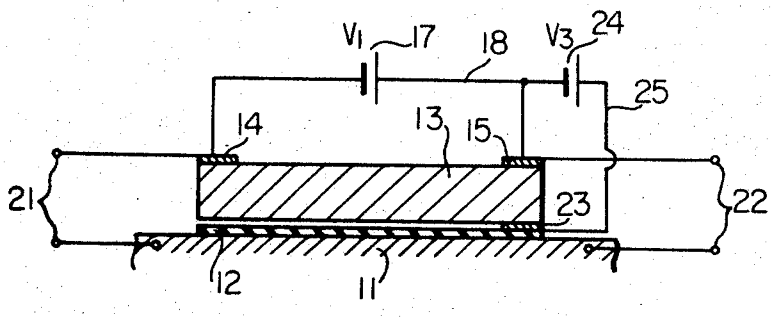

FIG. 4 shows a further embodiment of the present invention, in which a fourth electrode is provided on the opposed surface to the anode at the output side edge of the amplifier element of the solid state travelling wave amplifying device. In the drawing, reference numerals 11 to 15, 17, 18, 21 and 22 are showing those parts which are identical to the ones in FIG. 2. Here, 23 is the fourth electrode, and between this fourth electrode 23 and the anode 15 a DC power supply 24 of a voltage $V_3$ is connected so that its positive electrode is connected to the fourth electrode 23 and its negative electrode to the anode 15 by means of a DC power supply circuit 25. It should be appreciated here that the polarity of the DC power supply 24 may be in the reverse relationship to that shown in the drawing.

Further, in the case where the third electrode is provided adjacent to the input side, the device shows remarkable effects with respect to noise reduction and gain increase, whereas in the case when the fourth electrode is provided adjacent to the output side, the saturation output power is made much higher and the gain is also increased.

Figure 5:
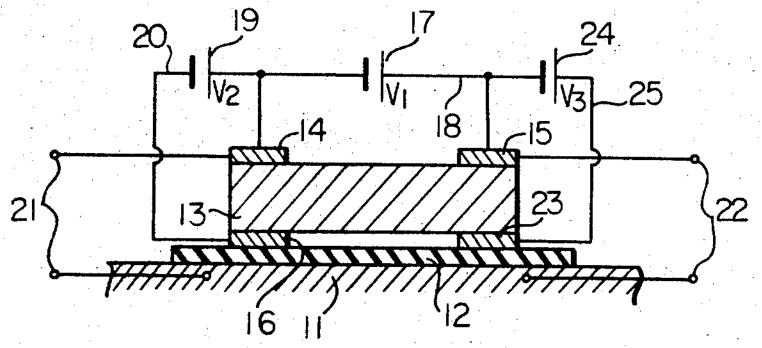

FIG. 5 shows a further embodiment, in which the fourth electrode 23 is provided adjacent to the anode 15 at the output side of the amplifier member 13 of the solid state travelling wave amplifying device as shown in FIG. 2. Between this fourth electrode 23 and the anode 15 the DC power supply 24 of a voltage $V_3$ is inserted so that its positive electrode is connected with the fourth electrode 24 and its negative electrode is with the anode 15, respectively. In the drawing, the identical parts to those shown in FIG. 2 are labeled with identical reference numerals.

In this embodiment, the DC power supply 19 may be connected so as to be in the reverse porality, and the other DC power supply 24 may also be connected in the reverse polarity to that shown in the drawing. Further, these DC power supplies 19 and 24 may be replaced by variable voltage supplies.

Figure 6:
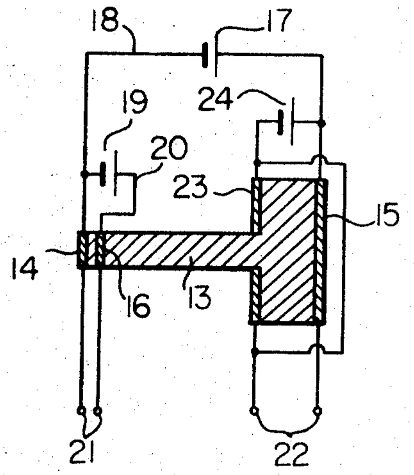

FIG. 6 shows a further embodiment of the device according to the present invention. In this drawing, all the references 13 to 24 are showing the identical elements to those which are shown in FIG. 4. Here, if a microwave signal is applied to the amplifier element 13 through the input terminals 21, the space-charge wave will be excited and the excited space-charge wave will grow along with the electron stream and reach the fourth electrode 23. Under this condition, if an electric field strength exceeding the critical value is applied to a part of the element 13 between the electrodes 15 and 23, this part will be provided with a negative differential mobility and, thereby, the space-charge wave reaching the electrode 23 is made to grow up as expanding in vertical direction to the electron stream and reaches finally to the electrode 15 so as to induce a high frequency voltage between the electrodes 15 and 23. Therefore, it is possible to take out an amplified microwave output power through the output terminals 22. This embodiment is featured in that the part of the amplifier element 13 between the electrodes 14 and 23 operates as the travelling wave amplifier and the part between the electrodes 23 and 15 operates as a two-terminal amplifier. It will be appreciated, therefore, that this embodiment has a combined structure of the travelling wave amplifier and the two-terminal amplifier, in which the respective advantageous features of both the amplifiers are simultaneously included. That is, the device of this embodiment has the unilateral and high gain features specific to the travelling wave amplifier and, yet, it is possible to obtain the microwave output power of the same degree as in the case of the two-terminal amplifiers at a high efficiency.

Figure 7A:
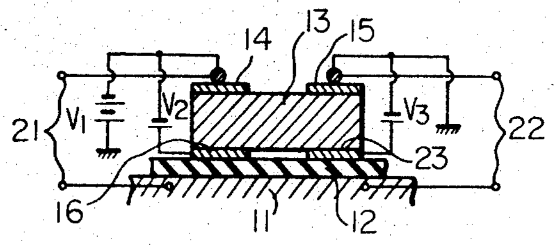
FIGS. 7A and 7B show an arragement and structure of testing sample, respectively.
Figure 7B:
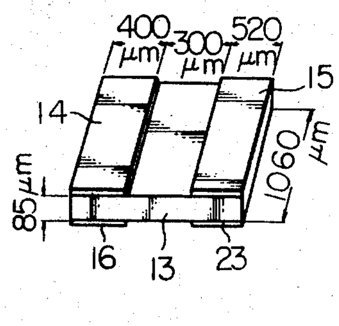

FIGS. 7A through 7E show an example of the present invention, in which FIGS. 7A and 7B show the structure and dimension of the test-sample device for this example. The semiconductor element is of *n*-type GaAs crystal prepared according to the boat growing technique, of which the carrier density is $3 \times 10^{12}$ /cc and the resistivity is 33Ω-cm. The four electrodes 14, 15, 16 and 23 are prepared by evaporating and alloying Au-Ge-Ni, and the input terminals 21 and output terminals 22 are matched to an external microwave circuit by means of stub tuner, respectively.

Figure 7C:
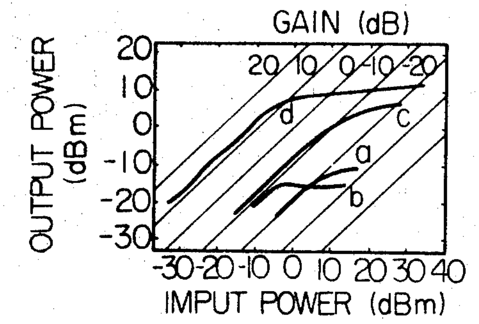
FIGS. 7C to 7E show characteristics of input power versus output power, voltage of input side additional electrode versus output power, and voltage of output side additional electrode versus output power, respectively.

FIG. 7C shows influences of the aforesaid additional DC biasing voltage upon the gain and saturation output power. The microwave frequency used is of 1.5 GHz and $V_1 = -270$V. In the diagram, curve *a* is input power versus output power characteristics in the case where the same conditions as in conventional two-electrode travelling wave amplifying devices are achieved by floating the electrodes 16 and 23 with respect to the DC potential. Small signal gain is −20 *d*B, and saturation output power is about 0.1 mW. Curve *b* in the diagram shows the characteristics in the case when a voltage of $V_2 = 60$V is applied between both electrodes 14 and 16 at the input side and the other electrode 23 at the output side is floated with respect to the DC potential. The small signal gain in this case is increased by about 10 *d*B as compared with the case of the curve *a*. Curve *c* is of the case where the electrode 16 is floated with respect to DC potential and a voltage $V_3 = 60$V is applied between the electrodes 15 and 23 at the output side. In this case of the curve *c*, the gain is increased by about 12 *d*B as compared with that in the curve *a*, and the saturation output power reaches 7 mW being increased about 18 *d*B as compared with that in the curve *a*. Further curve *d* is of the case where the voltages $V_1 = -270$V, $V_2 = 60$V and $V_3 = 60$V are applied to the respective electrodes, in which case the gain reaches 12 *d*B as increased by 30 *d*B comparing with the curve *a*. The output power shows 6mW at a point where the gain falls by 3 *d*B and 10 mW at a point of 0 *d*B gain, and an increase at the maximum 20 mW shows about 20 *d*B comparing with the curve *a*.

Figure 7D:
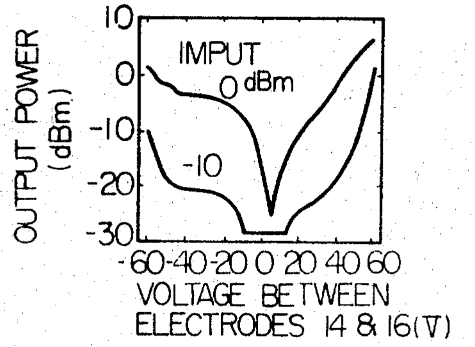

FIG. 7D shows the dependency of the output power upon the voltage $V_2$ (the voltage between the electrodes 14 and 16), that is, the relationship of output power to the voltage between the electrodes 14 and 16 at the input region under the condition of $V_1 = -270$ V and $V_3 = 60$V. In the drawing, input power is taken as the parameter and the cases of 0.1 mW and 1 mW inputs are shown. The former value can be deemed as a small signal input, whereas the latter value is a large signal input, the output power at which case may be deemed as the saturation output power. As seen in the diagram, the output power is increased depending on increases of the voltage $V_2$ in either side of positive and negative directions and its varying state is substantially symmetrical with respect to the positive and negative voltages. +20 V is the voltage at the time when the electrode 16 is floated with respect to DC potential and this point corresponds to the state in the case of conventional travelling wave amplifiers. It is seen that a variation is resulted to occur in the dependency of the output power upon the voltage $V_2$ at the vicinity of ±40 V. This value is approximately equal to the critical value of $V_2$, at which the electrode 14-to-16 direction field strength reaches the Gunn-effect critical value.

Figure 7E:
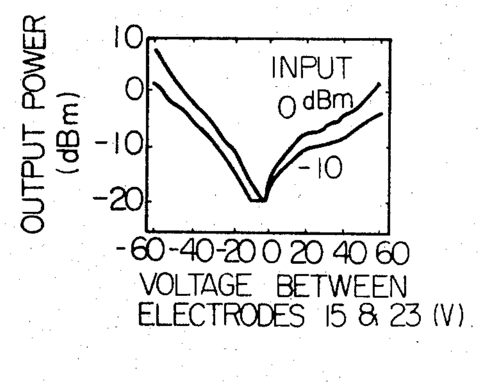

FIG. 7E shows output power characteristics in the case where the voltage values are set as $V_2 = 60$ V and $V_1 = -270$ V and the voltage $V_3$ is varied. The parameter is the same as in the case of FIG. 7D. The voltage between the electrodes 15 and 23 at the time when the electrode 23 is floated with respect to the DC is −10 V. The gain and output power increase substantially symmetrically depending on increases of the voltage in positive and negative directions. Its increased value is about 23 *d*B. As in the case of the input side, the state of variation changes nearly ±40 V which is considered to be the Gunn-effect critical value voltage.

From the foregoing results of the example, it is seen that the characteristics of conventional solid state travelling wave amplifying devices are improved in a great extent according to the present invention. In particular, in conventional solid state travelling wave amplifying devices, coupling loss of the microwave with the space-charge wave has been large due to the facts that the microwave electric field and the electron stream have not been parallel to each other at input section and there has been a part of below the threshold value electric field beneath the electrode. According to the present invention, it is made possible by applying the voltage $V_2$ to the input side to have the part below the threshold value electric field disappeared at the coupling section of the amplifier element so that the coupling loss can be reduced. It is considered, further, that at the output side the grown up space-charge wave excites the two-terminal amplifier of the output side. Therefore, the output power of this amplifying device of the invention is considered to be of the same degree with that of the two-terminal amplifier and, thus, it is possible to increase the saturation output power and also to increase the gain.

What we claim is:

1. A unilateral solid state travelling wave amplifying device comprising a semiconductor provided on a conductive base board being isolated by an insulator, negative and positive main ohmic electrodes provided at both edge portions of said semiconductor, said semiconductor having negative differential mobility so that when the strength of an electric field applied thereto by means of said negative and positive electrodes exceeds a critical value the average velocity of drifting electrons in the semiconductor is reduced in response to increase of the electric field, and microwave input means and microwave output means respectively provided to said semiconductor, at least one additional ohmic electrode independent of said negative and positive electrode and connected directly to said semiconductor having said negative differential mobility, and a DC voltage source connected between said additional ohmic electrode and at least one of said positive and negative electrodes, for supplying DC energy to said semiconductor.

2. A solid state travelling wave amplifying device according to claim 1, in which an additional electrode is provided at input side of said semiconductor.

3. A solid state travelling wave amplifying device according to claim 2, in which an additional electrode is provided at an opposing position to one of said main electrodes which is provided at the input side.

4. A solid state travelling wave amplifying device according to claim 2, in which an additional electrode is provided at the side of one of said main electrodes which is provided at the input side, independently of said main electrode and on substantially the same plane therewith.

5. A solid state travelling wave amplifying device according to claim 1, in which an additional electrode is provided at output side of the semiconductor.

6. A solid state travelling wave amplifying device according to claim 5, in which an additional electrode is provided at an opposing position to one of said main electrodes which is provided at the output side.

7. A solid state travelling wave amplifying device according to claim 5, in which an additional electrode is provided at the side of one of said main electrodes which is at the output side, independently of said main electrode and on substantially the same plane therewith.

8. A solid state travelling wave amplifying device according to claim 1, in which said additional electrodes are provided at both the input and output sides.

9. A solid state travelling wave amplifying device according to claim 1, in which cross-section area at the output side of the semiconductor element is made larger than that at the input side, and an additional electrode is provided at the output side.

* * * * *